United States Patent
Wu et al.

(10) Patent No.: US 12,140,418 B1
(45) Date of Patent: Nov. 12, 2024

(54) TOOL AND METHOD FOR MEASURING PARALLELISM AND COAXIALITY OF ROTATING SHAFTS OF SHOULDER JOINTS OF CRASH DUMMY

(71) Applicants: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

(72) Inventors: Yongqiang Wu, Tianjin (CN); Zhixin Liu, Tianjin (CN); Weidong Liu, Tianjin (CN); Shihang Chen, Tianjin (CN); Kai Wang, Tianjin (CN); Hanxiao Zhang, Tianjin (CN); Tianyi Hao, Tianjin (CN)

(73) Assignees: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 18/419,285

(22) Filed: Jan. 22, 2024

(30) Foreign Application Priority Data

Jul. 26, 2023 (CN) .......................... 202310919194.4

(51) Int. Cl.
*G01B 11/27* (2006.01)
*G09B 23/32* (2006.01)

(52) U.S. Cl.
CPC ............ *G01B 11/272* (2013.01); *G09B 23/32* (2013.01)

(58) Field of Classification Search
CPC .............................. G01B 11/272; G09B 23/32
See application file for complete search history.

(56) References Cited

U.S. PATENT DOCUMENTS

| | | | | |
|---|---|---|---|---|
| 6,568,096 B1 * | 5/2003 | Svitkin | ................. | B23Q 17/20 82/162 |
| 11,193,760 B2 * | 12/2021 | Strunk | ................. | G01B 11/272 |
| 11,514,213 B2 * | 11/2022 | Shah | ....................... | G06F 30/12 |
| 11,650,048 B2 * | 5/2023 | Strunk | ................. | G01S 7/4817 356/400 |
| 11,747,138 B2 * | 9/2023 | Al Ibrahim | ............... | F16H 1/46 33/228 |

FOREIGN PATENT DOCUMENTS

| | | |
|---|---|---|
| CN | 102175208 A | 9/2011 |
| CN | 202547572 U | 11/2012 |

(Continued)

OTHER PUBLICATIONS

First Office Action issued in counterpart Chinese Patent Application No. 202310919194.4, dated Aug. 23, 2023.

*Primary Examiner* — Yaritza Guadalupe-McCall
(74) *Attorney, Agent, or Firm* — Westbridge IP LLC

(57) ABSTRACT

Disclosed are a tool and a method for measuring a parallelism and coaxiality of a rotating shaft of shoulder joint of a crash dummy, relating to the technical field of vehicle safety crash testing dummies. The measuring tool and a method can efficiently and accurately measure the coaxiality and parallelism of the rotating shaft of shoulder joint of the crash dummy.

9 Claims, 13 Drawing Sheets

(56) References Cited

FOREIGN PATENT DOCUMENTS

| | | | |
|---|---|---|---|
| CN | 103148777 A | | 6/2013 |
| CN | 103331746 A | | 10/2013 |
| CN | 103630098 A | | 3/2014 |
| CN | 109238210 A | | 1/2019 |
| CN | 110037892 A | | 7/2019 |
| CN | 115265355 A | | 11/2022 |
| CN | 218342156 U | | 1/2023 |
| CN | 116625280 A | * | 8/2023 |
| CN | 116625280 B | * | 10/2023 |
| JP | 2000015567 A | | 1/2000 |

* cited by examiner

TOOL AND METHOD FOR MEASURING PARALLELISM AND COAXIALITY OF ROTATING SHAFTS OF SHOULDER JOINTS OF CRASH DUMMY

CROSS-REFERENCE TO RELATED APPLICATIONS

The present application claims priority to Chinese Patent Application No. 202310919194.4, filed on Jul. 26, 2023 and entitled "Tool and Method for Measuring Parallelism and Coaxiality of Rotating Shafts of Shoulder Joints of Crash Dummy", the content of which is incorporated herein by reference in its entirety.

TECHNICAL FIELD

The present application generally relates to the technical field of vehicle safety crash testing dummies, and specifically relates to a tool and a method for measuring a parallelism and coaxiality of a rotating shaft of shoulder joint of a crash dummy.

BACKGROUND

An existing vehicle crash dummy includes a skeleton and a skin, where the skeleton of the vehicle crash dummy has a relatively complex structure. The processing of the skeleton includes a plurality of processes, for example, a rotating shaft of shoulder joint is formed by turning, milling, and the like. However, during milling and drilling, parts deform inevitably due to clamping and the like to affect their tolerance accuracy. It is difficult to efficiently and accurately measure tolerances of a coaxiality of two holes and a parallelism of two planes of the rotating shaft of the shoulder joint, and the impact of measurement errors is very serious. If the measurement errors are not found in a timely manner, some body parameters of the dummy and the affected crash test may not match with reality. At present, conventional measuring methods using laser displacement sensors can only ensure that two planes or two straight lines are parallel, but ignore whether their positions are correct, such that parts may not meet requirements. Due to the limitations of the measuring methods, qualified parts cannot be accurately distinguished. Therefore, a tool and a method for measuring a parallelism and coaxiality of a rotating shaft of shoulder joint of a crash dummy are provided to solve the above problems.

SUMMARY

In view of the above defects or deficiencies in existing technologies, it is desired to provide a tool and a method for measuring a parallelism and coaxiality of a rotating shaft of shoulder joint of a crash dummy, which efficiently and accurately measure the coaxiality and parallelism and improve machining precision of the shoulder joint shaft.

First, the present application provides a tool for measuring a parallelism and coaxiality of a rotating shaft of shoulder joint of a crash dummy, including:
   a support base plate, where a support platform for bearing the rotating shaft of shoulder joint is disposed on the support base plate; a width direction of the support platform is parallel to that of the support base plate, and a length direction of the support platform is parallel to that of the support base plate; the rotating shaft of shoulder joint includes a base, a mounting platform is disposed on the base, and a first side plate and a second side plate are disposed on a side, away from the base, of the mounting platform;
   a clamping assembly, where the clamping assembly includes a first support seat disposed on the support base plate, and a first V-shaped block and a second V-shaped block connected to the first support seat through an adjusting member; an accommodating space is formed between the first V-shaped block and the second V-shaped block to accommodate the base; when the adjusting member rotates relative to the first support seat, the first V-shaped block and the second V-shaped block are driven to approach each other, so as to clamp the base; and
   a measuring assembly, where the measuring assembly includes a moving unit disposed on the support base plate and a measuring unit disposed on the moving unit; the measuring unit has a first measuring end, a second measuring end, and a third measuring end; a measuring direction of the first measuring end faces a surface, away from the second side plate, of the first side plate, and the first measuring end is used for measuring the distance between the first measuring end and the first side plate or the second side plate; the second measuring end and the third measuring end are located between the first side plate and the second side plate, a measuring direction of the second measuring end is opposite to that of the third measuring end, and the measuring direction of the second measuring end is parallel to the width direction of the support platform; the second measuring end is used for measuring the distance between the second measuring end and the first side plate or the second side plate; the third measuring end is used for measuring the distance between the third measuring end and the second side plate or the first side plate;
   where the moving unit has a driving end, which is connected to the measuring unit and is used for driving the measuring unit to move, so as to change relative positions of the first measuring end, the second measuring end, the third measuring end, and the corresponding first side plate or second side plate.

In a second aspect, the present application provides a method for measuring a parallelism and coaxiality of a rotating shaft of shoulder joint of a crash dummy, implemented based on the foregoing tool for measuring the parallelism and coaxiality of the rotating shaft of shoulder joint of the crash dummy, the measuring method including the following steps:
   the moving unit drives the measuring unit to move, and the first measuring end measures real-time distances between the first measuring end and sampling points on the first side plate to obtain a plurality of first distances; the first measuring end measures real-time distances between the first measuring end and sampling points on the second side plate to obtain a plurality of second distances; and simultaneously, the second measuring end measures real-time distances between the second measuring end and sampling points on the first side plate or the second side plate to obtain a plurality of third distances; the third measuring end measures real-time distances between the third measuring end and sampling points on the second side plate or the first side plate to obtain a plurality of fourth distances; collecting position information of the first measuring end, the second measuring end, and the third measuring end in real time;

obtaining a global coordinate system and a local coordinate system;

in the global coordinate system, obtaining at least three first edge points corresponding to the first distance and at least three second edge points corresponding to the second distance;

computing a first center coordinate point of a first opening of the first side plate according to the first edge points, and a second center coordinate point of a second opening of the second side plate according to the second edge points;

computing a coaxiality difference according to the first center coordinate point and the second center coordinate point;

in the local coordinate system, obtaining at least three first coordinate points corresponding to the third distance and located on the first side plate or the second side plate, and at least three second coordinate points corresponding to the fourth distance and located on the second side plate or the first side plate;

converting the first coordinate points and the second coordinate points into coordinate points in the global coordinate system to obtain third coordinate points and fourth coordinate points;

computing a normal vector relationship value of the first side plate and the second side plate according to the third coordinate points and the fourth coordinate points; and determining that the current rotating shaft of shoulder joint is a qualified part when the coaxiality difference is within a coaxiality tolerance range and the normal vector relationship value is within a normal vector tolerance range.

In summary, the present application discloses a specific structure of a tool for measuring a parallelism and coaxiality of a rotating shaft of shoulder joint of a crash dummy. In the present application, a support platform for bearing the rotating shaft of shoulder joint is disposed on a support base plate, where the rotating shaft of shoulder joint has a base, a mounting plate disposed on the base, and a first side plate and a second side plate disposed on the mounting plate; a clamping assembly is disposed on the support base plate and includes a first support seat disposed on the support base plate, and a first V-shaped block and a second V-shaped block connected to the first support seat through an adjusting member; an accommodating space is formed between the first V-shaped block and the second V-shaped block to accommodate the base; when the adjusting member rotates relative to the first support seat, the first V-shaped block and the second V-shaped block are driven to approach each other, so as to clamp the base; the measuring tool further includes a measuring assembly, which includes a moving unit disposed on the support base plate and a measuring unit disposed on the moving unit; the measuring unit has a first measuring end, a second measuring end, and a third measuring end, where a measuring direction of the first measuring end faces a surface, away from the second side plate, of the first side plate, and the first measuring end is used for measuring the distance between the first measuring end and the first side plate or the second side plate; the second measuring end and the third measuring end are located between the first side plate and the second side plate, a measuring direction of the second measuring end is opposite to that of the third measuring end, and the measuring direction of the second measuring end is parallel to the width direction of the support platform; the second measuring end is used for measuring the distance between the second measuring end and the first side plate or the second side plate; and the third measuring end is used for measuring the distance between the third measuring end and the second side plate or the first side plate. In addition, the moving unit has a driving end, which is connected to the measuring unit and is used for driving the measuring unit to move, so as to change relative positions of the first measuring end, the second measuring end, the third measuring end, and the corresponding first side plate or second side plate.

The present application discloses the clamping assembly clamps the base of the rotating shaft of shoulder joint to limit the position of the rotating shaft of shoulder joint to a certain extent, so as to ensure measurement accuracy; the moving unit and the measuring unit cooperate to measure the first side plate and the second side plate; by measuring and computing a normal vector relationship value of the two side plates, a parallelism of the two side plates is indirectly determined, that is, the parallelism of the two side plates and a coaxiality of openings on the two side plates can be quickly measured and computed, the coaxiality and parallelism can be measured more efficiently and accurately, and the machining precision of the rotating shaft of shoulder joint can be improved.

BRIEF DESCRIPTION OF THE DRAWINGS

Other features, objectives and advantages of the present application will become more apparent by reading the detailed description of non-limiting embodiments made with reference to the following accompanying drawings.

FIG. 2 is an enlarged schematic diagram of part A in FIG. 1a.

FIG. 3 is an enlarged schematic diagram of part B in FIG. 1a.

DETAILED DESCRIPTION OF THE EMBODIMENTS

Figure 1A:
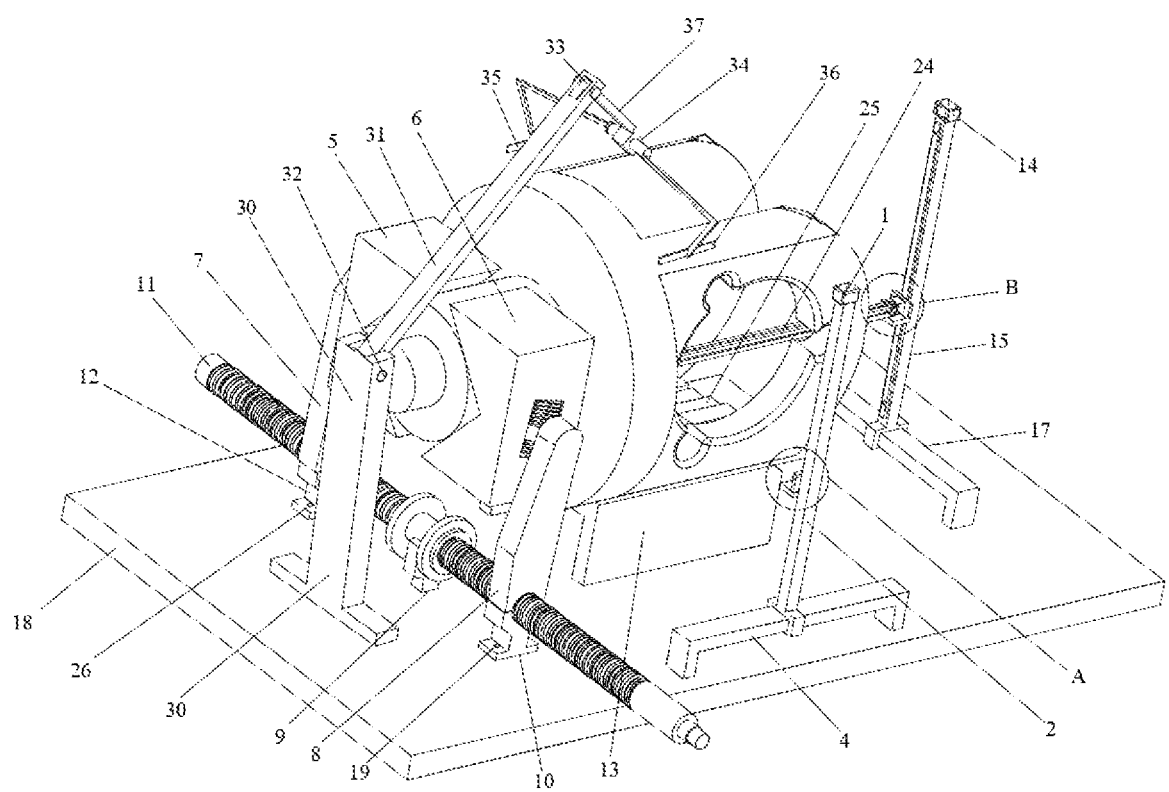
FIG. 1a is a schematic structural diagram of a tool for measuring a parallelism and coaxiality of a rotating shaft of shoulder joint of a crash dummy.

The present application is further described in detail below with reference to the accompanying drawings and embodiments. It can be understood that the specific embodiments described here are only used to explain the related application, but not to limit the present application. In addition, it needs to be noted that, for the convenience of description, only the parts related to the application are shown in the drawings.

It is to be noted that the embodiments and features in the embodiments of the present application may be combined with each other without conflict. The present application will be described below in detail with reference to the accompanying drawings and in conjunction with the embodiments.

Embodiment 1

Figure 5:
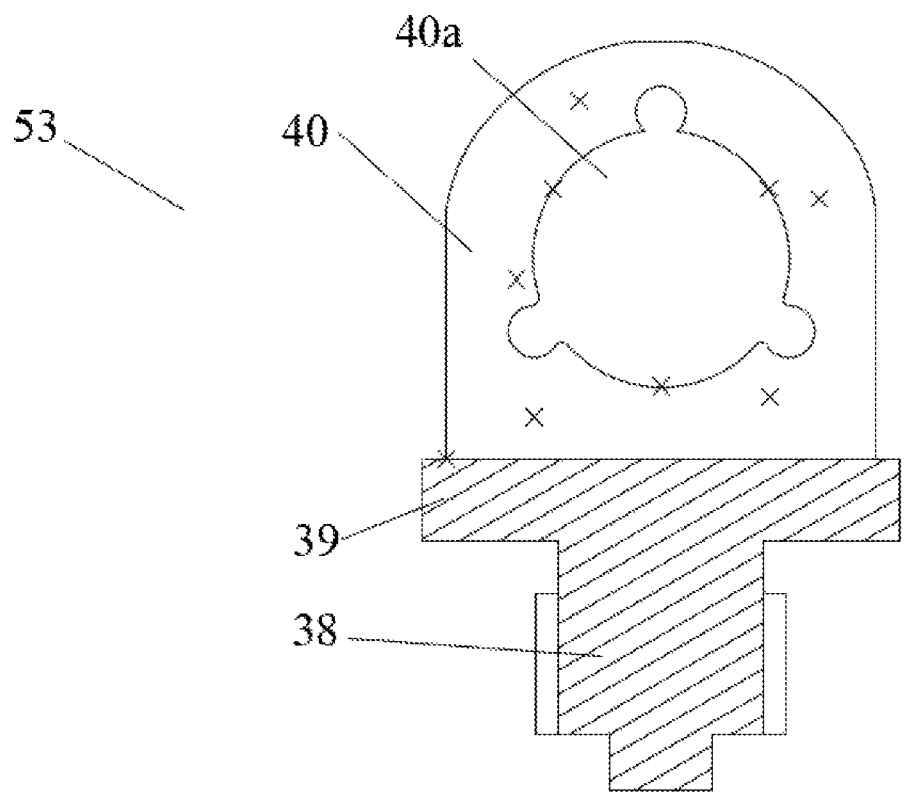
FIG. 5 is a schematic structural diagram of a first side plate.
Figure 6:
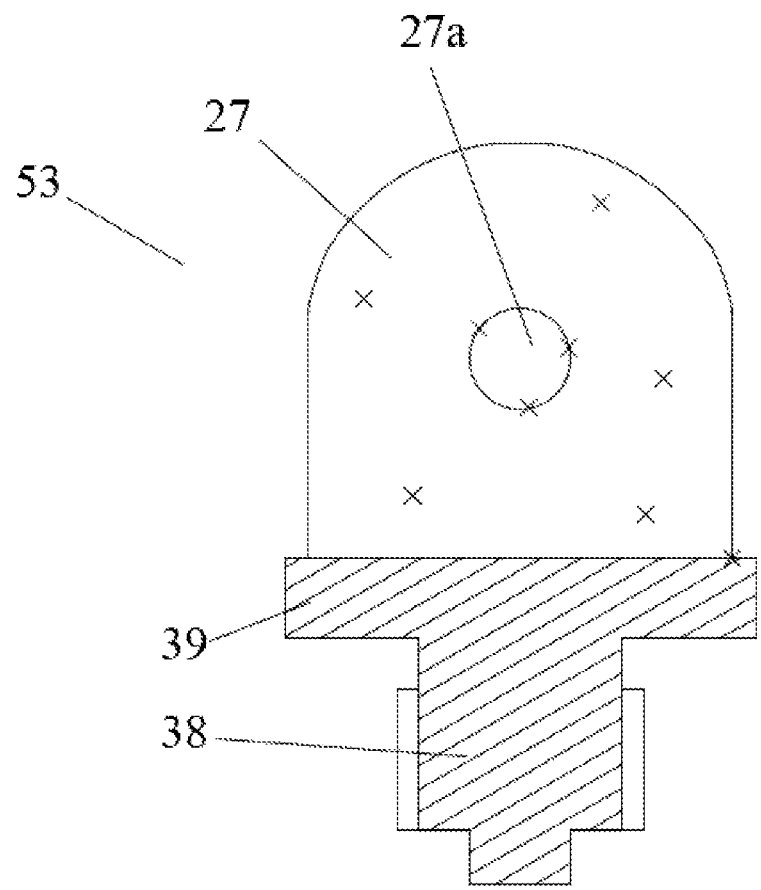
FIG. 6 is a schematic structural diagram of a second side plate.

Refer to FIG. 1a, the present application discloses a schematic structural diagram of a first embodiment of a tool for measuring a parallelism and coaxiality of a rotating shaft of shoulder joint 53 of a crash dummy. The measuring tool includes:

a support base plate 18, as a basic load-bearing component of the measuring tool, for bearing devices required for measurement. A support platform 13 for bearing the rotating shaft of shoulder joint 53 is disposed on the support base plate 18. As shown in FIG. 1a, a width direction of the support platform 13 is parallel to that of the support base plate 18, and a length direction of the support platform 13 is parallel to that of the support base plate 18. As shown in FIG. 5 and FIG. 6, the rotating shaft of shoulder joint 53 includes a base 38, a mounting platform 39 is disposed on the base 38, and a first side plate 40 and a second side plate 27 are disposed on a side, away from the base 38, of the mounting platform 39. Here, the rotating shaft of shoulder joint 53 has an integrally formed structure. For ease of description, the rotating shaft of shoulder joint 53 is divided into a base 38, a mounting platform 39, a first side plate 40, and a second side plate 27.

A clamping assembly 41 for clamping the base 38 to prevent the rotating shaft of shoulder joint 53 from moving on the support platform 13 during measurement to affect the accuracy of measurement. As shown in FIG. 1c, the clamping assembly 41 includes a first support seat 9 disposed on the support base plate 18, and a first V-shaped block 5 and a second V-shaped block 6 connected to the first support seat 9 through an adjusting member 42. An accommodating space 5a is formed between the first V-shaped block 5 and the second V-shaped block 6 to accommodate the base 38. When the adjusting member 42 rotates relative to the first support seat 9, the first V-shaped block 5 and the second V-shaped block 6 are driven to approach each other, so as to clamp the base 38.

Figure 1B:
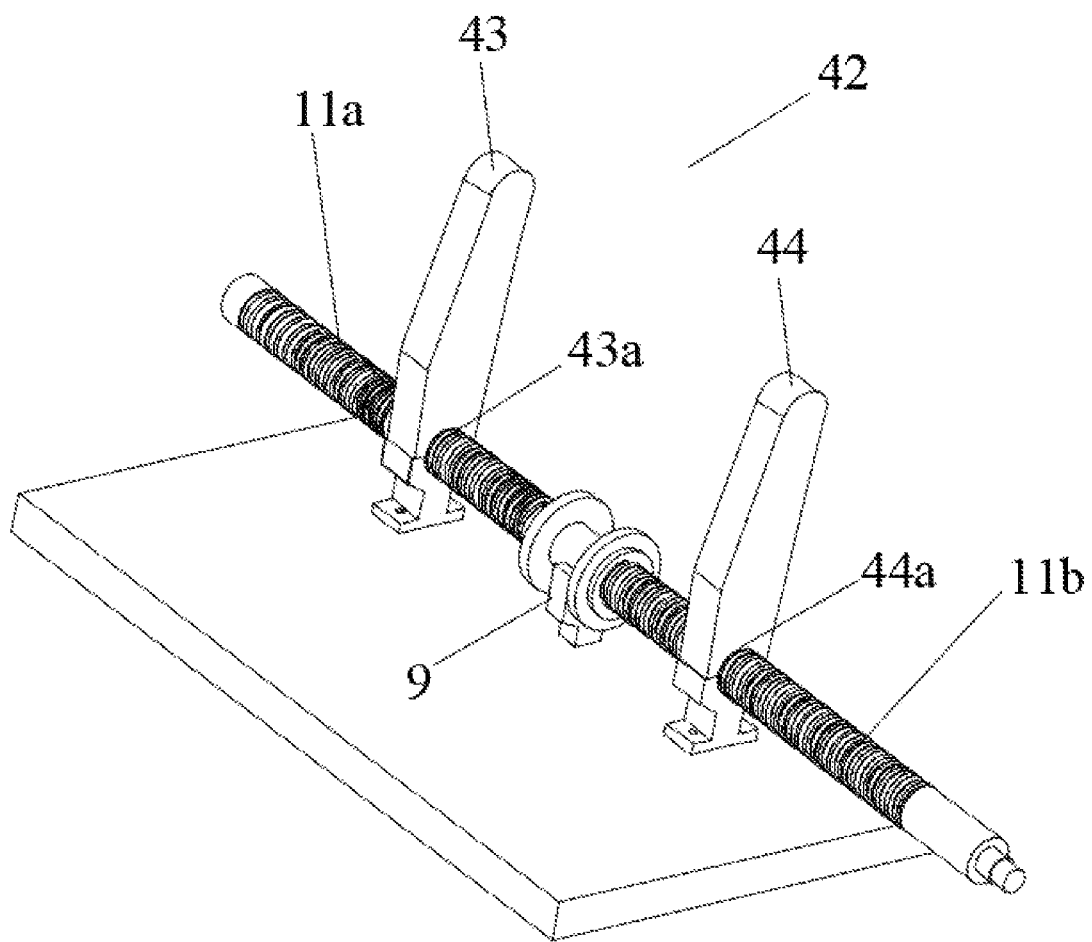
FIG. 1b is a schematic structural diagram of an adjusting member.
Figure 1C:
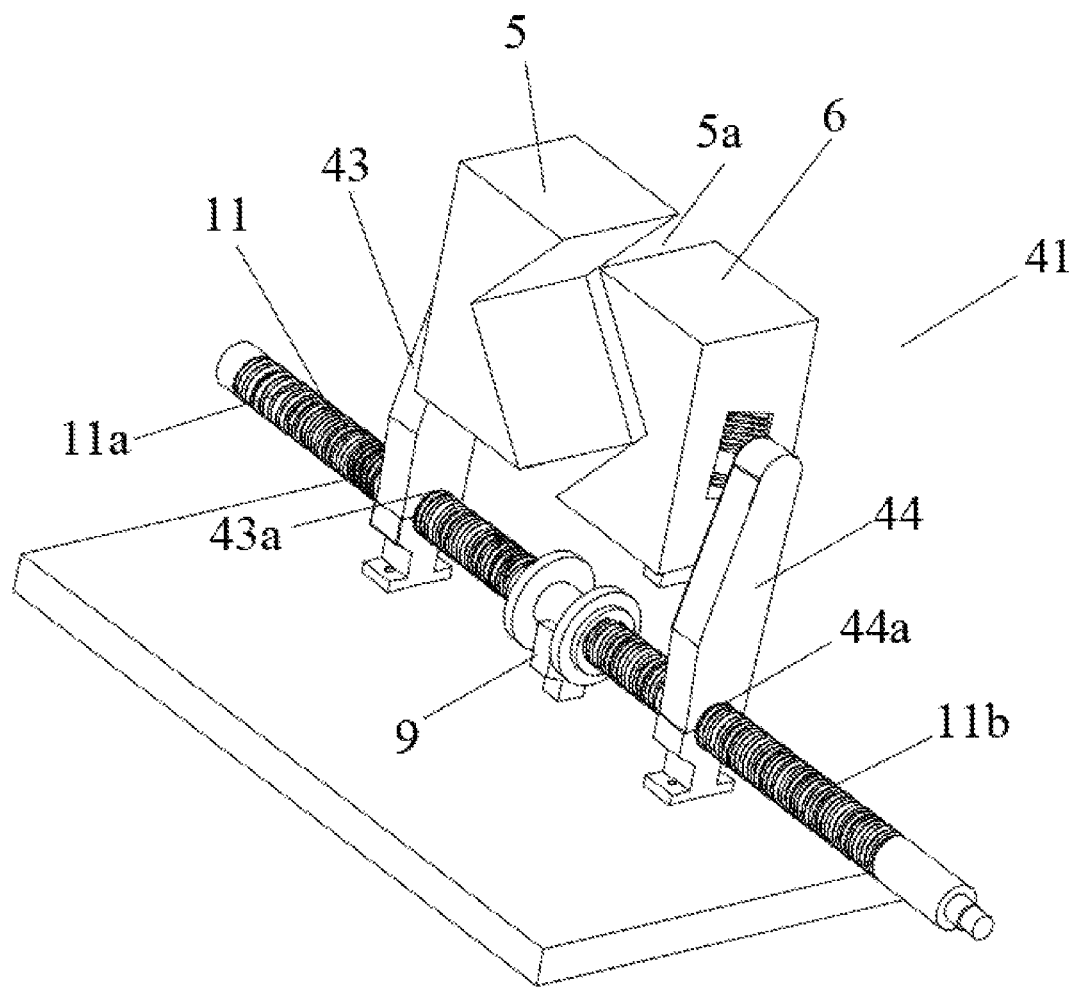
FIG. 1c is a schematic structural diagram of a clamping assembly.

As shown in FIG. 1b, the adjusting member 42 includes:
an adjusting bolt 11 rotatably connected to the first support seat 9, where the adjusting bolt 11 has a first threaded segment 11a and a second threaded segment 11b with opposite rotation directions;
a first moving member 43 having a first threaded hole 43a, where the first threaded hole 43a is sleeved on the first threaded segment 11a, and the first V-shaped block 5 is disposed on the first moving member 43; and
a second moving member 44 having a second threaded hole 44a, where the second threaded hole 44a is sleeved on the second threaded segment 11b, and the second V-shaped block 6 is disposed on the second moving member 44.

When the adjusting bolt 11 rotates, the first moving member 43 and the second moving member 44 move along the adjusting bolt 11. Due to the opposite rotation directions of the first threaded segment 11a and the second threaded segment 11b, the first moving member 43 and the second moving member 44 can approach or move away from each other when the adjusting bolt 11 rotates, to drive the corresponding first V-shaped block 5 and second V-shaped block 6 to approach or move away from each other, and to change the size of the accommodating space 5a, thereby achieving a purpose of clamping or loosening the base 38.

Specifically, as shown in FIG. 1a, the first moving member 43 includes a first bracket 7 and a third support seat 12 connected to each other, and the first threaded hole 43a is formed at the connection position of the first bracket 7 and the third support seat 12; and the second moving member 44 includes a second bracket 8 and a second support seat 10 connected to each other, and the second threaded hole 44a is formed at the connection position of the second bracket 8 and the second support seat 10. From FIG. 1a, it can be seen that ends, near a surface of the support base plate 18, of the third support seat 12 and the second support seat 10 are plate-like. As shown in FIG. 1a, the end, near the support base plate 18, of the third support seat 12 has a width and can be in contact with the surface of the support base plate 18. Similarly, the end, near the support base plate 18, of the second support seat 10 has a width and can be in contact with the surface of the support base plate 18. When the adjusting bolt 11 rotates, the third support seat 12 and the second support seat 10 abut against the surface of the support base plate 18, the third support seat 12 and the second support seat 10 are limited in an axial direction of the adjusting bolt 11 to prevent the first moving member 43 and the second moving member 44 from rotating with the adjusting bolt 11, and the first moving member 43 and the second moving member 44 convert rotating force into horizontal moving force, so as to drive the first V-shaped block 5 and the second V-shaped block 6 to move.

Figure 4:
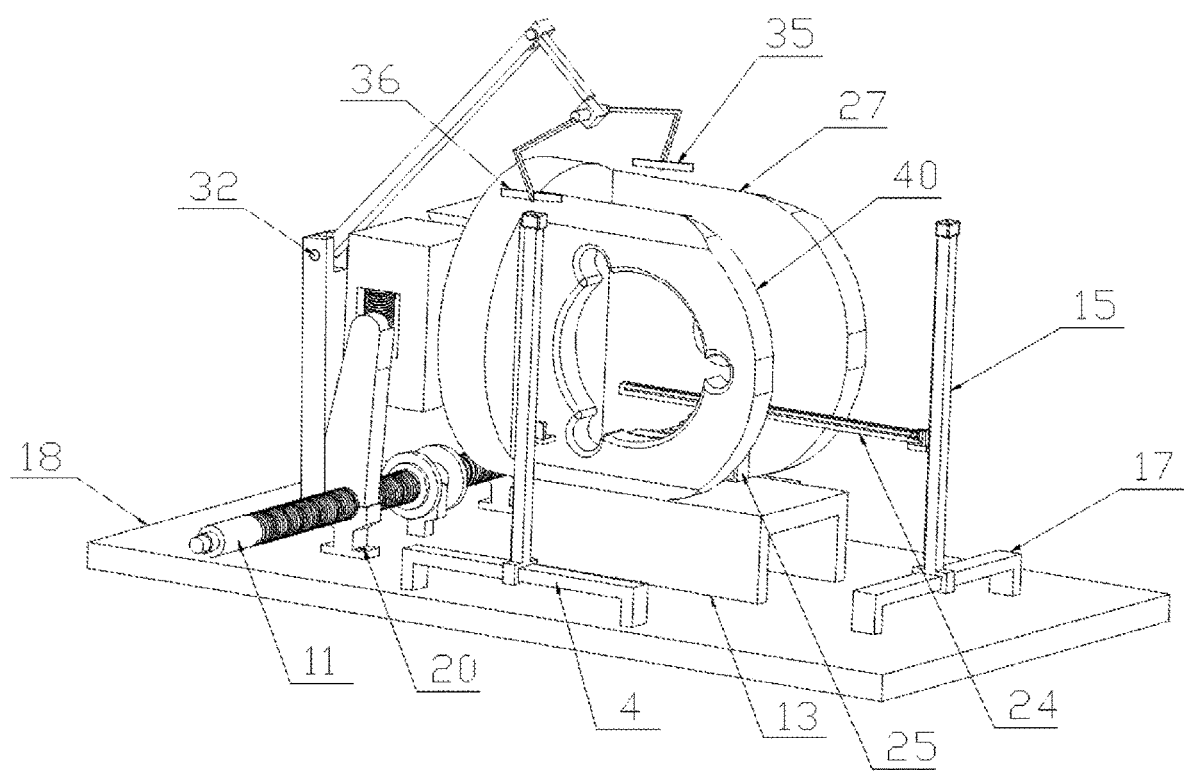
FIG. 4 is a schematic diagram of an overall structure of the measuring tool.

Here, as shown in FIG. 1a and FIG. 4, the end, near the surface of the support base plate 18, of the second support seat 10 after clamping the base 38 may be further connected to the support base plate 18 by a first compression screw 19 and a second compression screw 20, and as shown in FIG. 1a, the end, near the surface of the support base plate 18, of the third support seat 12 after clamping the base 38 is connected to the support base plate 18 by two third compression screws 26. The first compression screw 19, the second compression screw 20, and the third compression screws 26 further assist in locking the positions of the first V-shaped block 5 and the second V-shaped block 6, such that the first V-shaped block 5 and the second V-shaped block 6 can stably clamp the base 38.

Figure 1D:
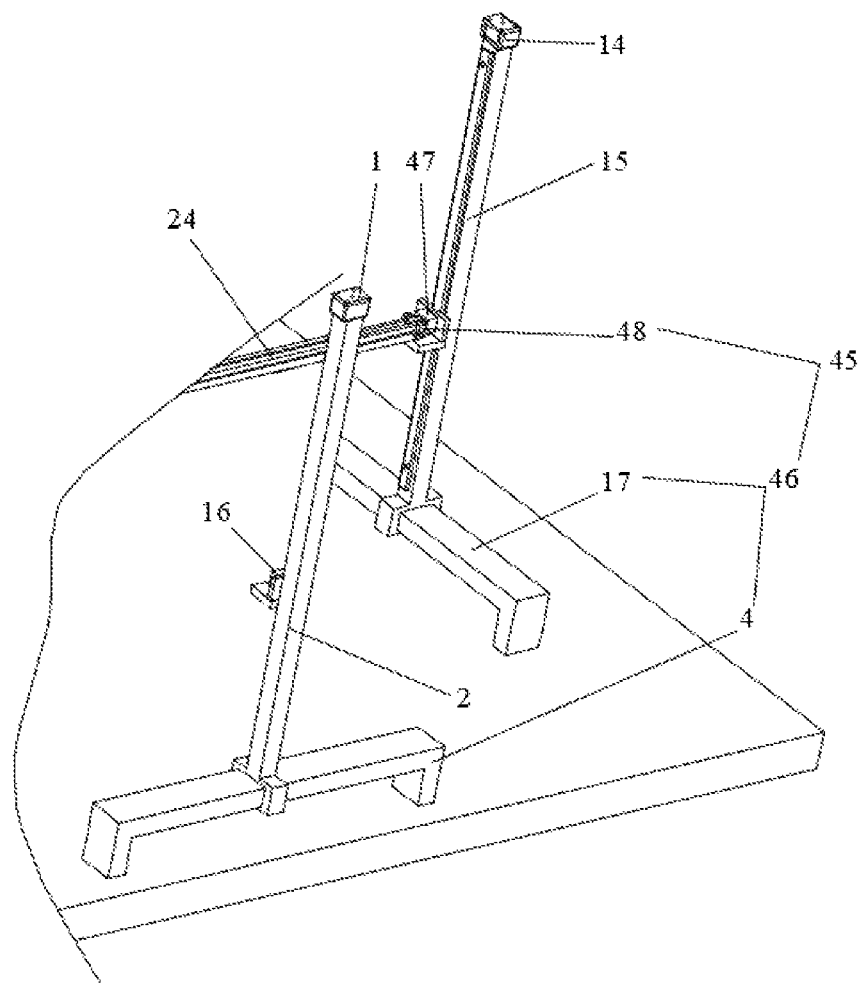
FIG. 1d is a schematic structural diagram of a moving unit and a measuring unit in a measuring assembly.

As shown in FIG. 1d, a measuring assembly 45 includes a moving unit 46 disposed on the support base plate 18 and a measuring unit 48 disposed on the moving unit 46; the measuring unit 48 has a first measuring end 3a, a second measuring end 16a, and a third measuring end 23a; a measuring direction of the first measuring end 3a faces a surface, away from the second side plate 27, of the first side plate 40, and the first measuring end 3a is used for measuring the distance between the first measuring end 3a and the first side plate 40 or the second side plate 27; the second measuring end 16a and the third measuring end 23a are located between the first side plate 40 and the second side plate 27, a measuring direction of the second measuring end 16a is opposite to that of the third measuring end 23a, and the measuring direction of the second measuring end 16a is parallel to the width direction of the support platform 13; the second measuring end 16a is used for measuring the distance between the second measuring end 16a and the first side plate 40 or the second side plate 27; and the third measuring end 23*a* is used for measuring the distance between the third measuring end 23*a* and the second side plate 27 or the first side plate 40.

Figure 1E:
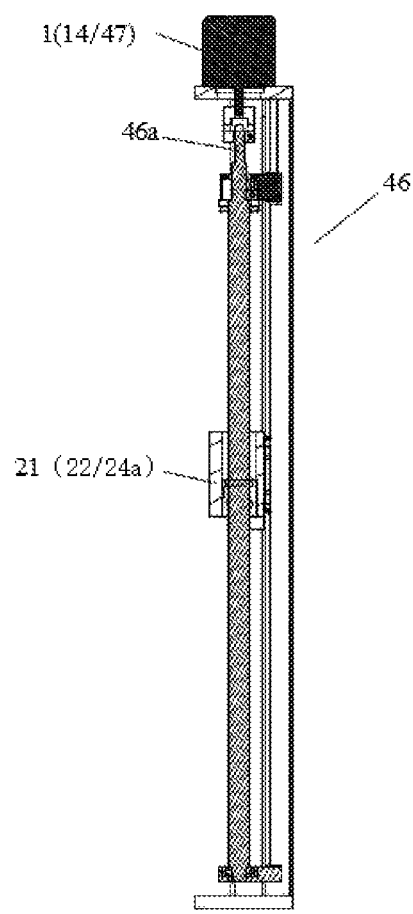
FIG. 1e is a schematic structural diagram of a moving unit.

As shown in FIG. 1*e*, the moving unit 46 has a driving end 46*a*, which is connected to the measuring unit 48 and is used for driving the measuring unit 48 to move, so as to change relative positions of the first measuring end 3*a*, the second measuring end 16*a*, the third measuring end 23*a*, and the corresponding first side plate 40 or second side plate 27.

Figure 2:
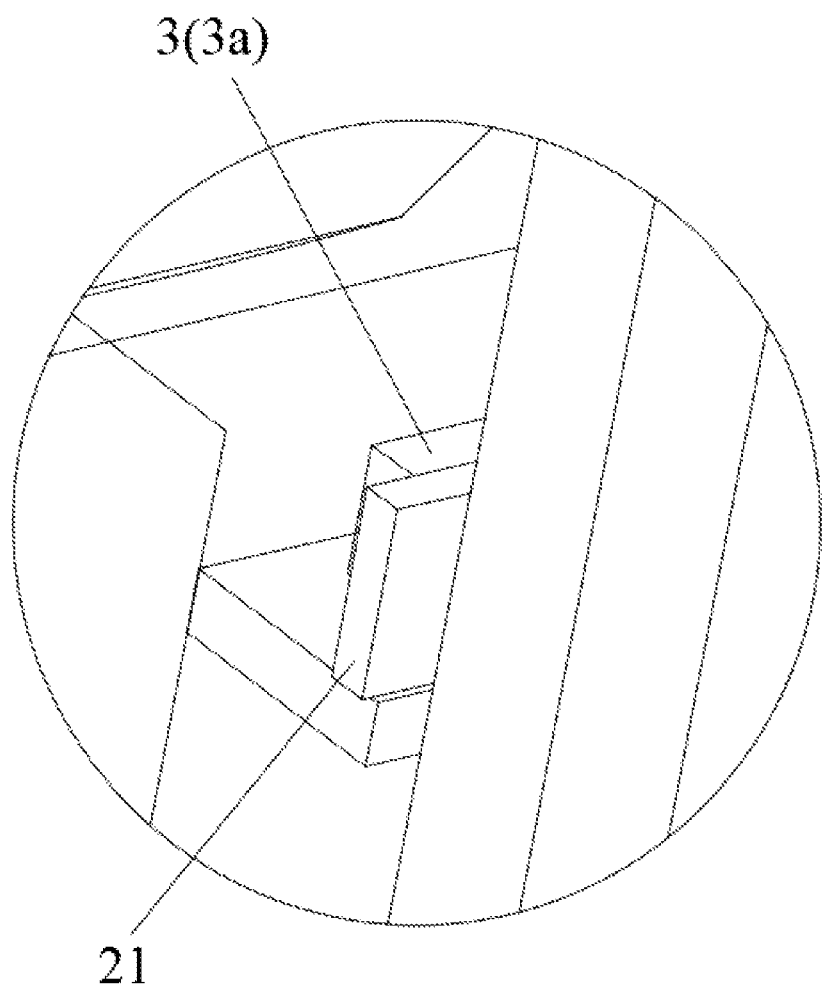

Specifically, as shown in FIG. 1*d* and FIG. 1*e*, the moving unit 46 includes:

a first sliding platform 4 disposed on the support base plate 18 to provide a sliding track for a first lifting guide rail 2. The first lifting guide rail 2 is connected to the first sliding platform 4 in a sliding manner, and a sliding direction of the first lifting guide rail 2 is parallel to the length direction of the support base plate 18. As shown in FIG. 2, a movable first mounting plate 21 is disposed on the first lifting guide rail 2, a moving direction of the first mounting plate 21 is perpendicular to the surface of the support base plate 18, and the first mounting plate 21 is used for bearing a first distance measuring member 3.

A first driving member 1 disposed at either end of the first lifting guide rail 2. A driving end 46*a* of the first driving member 1 is connected to the first mounting plate 21. Here, the type of the first driving member 1 is a driving cylinder, and its model is AirTAC TN16×10S, for example.

The first lifting guide rail 2 can move on the first sliding platform 4 in the length direction of the support base plate 18, and the first driving member 1 can drive the first distance measuring member 3 to move in a direction perpendicular to the surface of the support base plate 18, so as to change the position of the first distance measuring member 3 relative to the first side plate 40.

Figure 3:
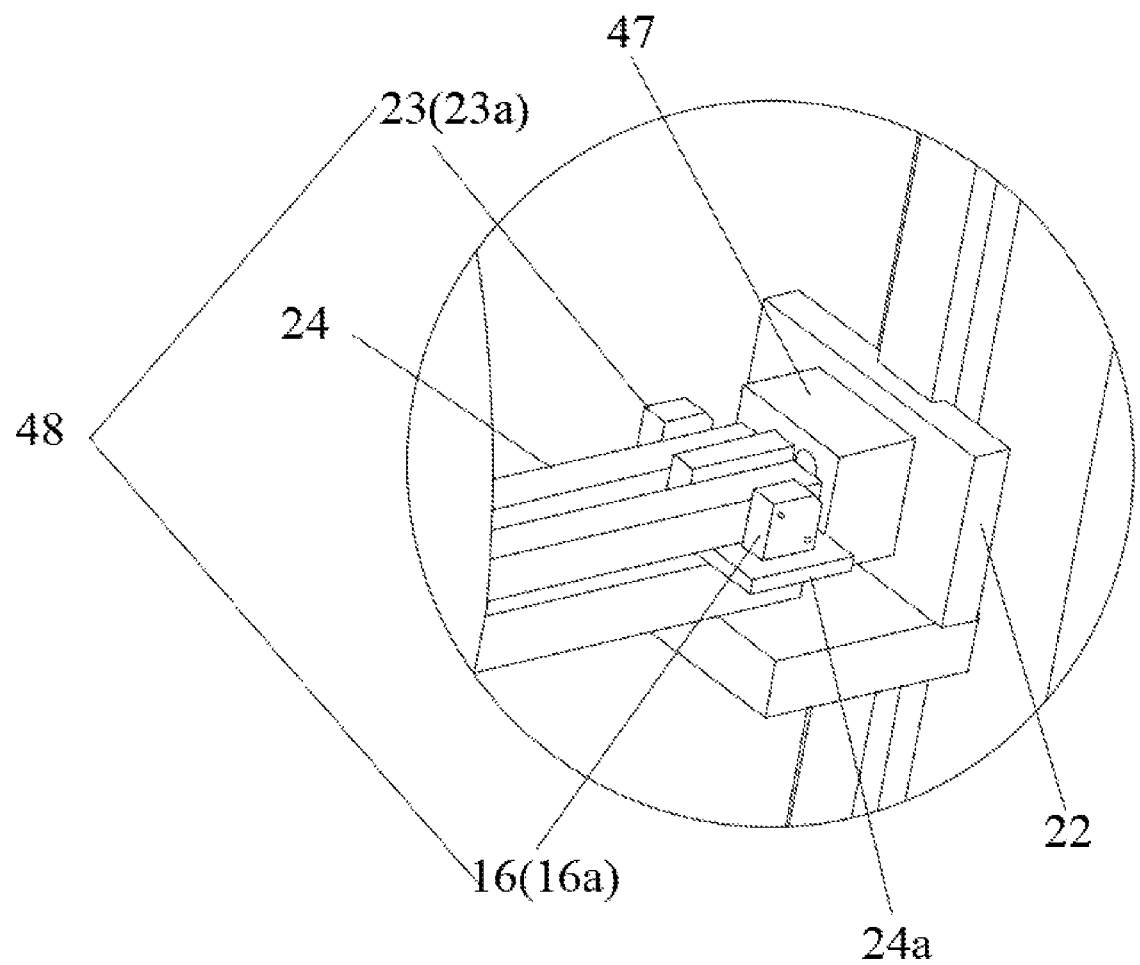

A second sliding platform 17 disposed on the support base plate 18 to provide a sliding track for a second lifting guide rail 15. The second lifting guide rail 15 is connected to the second sliding platform 17 in a sliding manner, and a sliding direction of the second lifting guide rail 15 is perpendicular to that of the first lifting guide rail 2. As shown in FIG. 3, a movable second mounting plate 22 is disposed on the second lifting guide rail 15, and a moving direction of the second mounting plate 22 is parallel to that of the first mounting plate 21.

A second driving member 14 disposed at either end of the second lifting guide rail 15. A driving end 46*a* of the second driving member 14 is connected to the second mounting plate 22. Here, the type of the second driving member 14 is a driving cylinder, and its model is AirTAC TN16×10S, for example.

A slide rail 24 mounted on the second mounting plate 22 and located between the first side plate 40 and the second side plate 27. A movable slider 24*a* is disposed on the slide rail 24. A moving direction of the slider 24*a* is parallel to the length direction of the support platform 13, and the slider 24*a* is used for mounting a second distance measuring member 16 and a third distance measuring member 23.

A third driving member 47 disposed at either end of the slide rail 24. The third driving member 47 is connected to the slider 24*a*. Here, the type of the third driving member 47 is a driving cylinder, and its model is AirTAC TN16×10S, for example.

The second lifting guide rail 15 can move on the second sliding platform 17 in a direction perpendicular to the sliding direction of the first lifting guide rail 2, the second driving member 14 can drive the slide rail 24 to move in a direction parallel to the moving direction of the first mounting plate 21, and the third driving member 47 can drive the second distance measuring member 16 and the third distance measuring member 23 to move in a direction parallel to the surface of the support platform 13, so as to change the positions of the second distance measuring member 16 and the third distance measuring member 23 relative to the first side plate 40 or the second side plate 27.

Driving force for the movement of the first lifting guide rail 2 along the first sliding platform 4 and driving force for the movement of the second lifting guide rail 15 along the second sliding platform 17 may come from driving cylinders, respectively. For example, a driving cylinder is mounted at one end of the first sliding table 4, and a driving end 46*a* of the driving cylinder is connected to the first lifting guide rail 2, so as to drive the first lifting guide rail 2 to move; and a driving cylinder is mounted at one end of the second sliding platform 17, and a driving end 46*a* of the driving cylinder is connected to the second lifting guide rail 15, so as to drive the second lifting guide rail 15 to move.

As shown in FIGS. 1*d*, 2, and 3, the measuring unit 48 includes:

the first distance measuring member 3 disposed on the first mounting plate 21, where a measuring end of the first distance measuring member 3 is the first measuring end 3*a*; and the second distance measuring member 16 and the third distance measuring member 23 disposed on the slider 24*a*, where a measuring end of the second distance measuring member 16 is the second measuring end 16*a*, and a measuring end of the third distance measuring member 23 is the third measuring end 23*a*.

Here, the types of the first distance measuring member 3, the second distance measuring member 16, and the third distance measuring member 23 are laser displacement sensors, and their models are Panasonic HG-C1400-P, for example.

Further, as shown in FIG. 1*a* and FIG. 4, the measuring tool further includes: an auxiliary clamping assembly 41, where the auxiliary clamping assembly 41 further includes:

a support arm 30 disposed on the support base plate 18 as a basic load-bearing component of the auxiliary clamping assembly 41;

a first support joint arm 31 rotatably connected to the support arm 30 through a first pin shaft 32;

a second support joint arm 37 rotatably connected to the first support joint arm 31 through a second pin shaft 33; and a first compression plate 35 and a second compression plate 36 hinged with the second support joint arm 37 through an adjusting block 34.

When the first support joint arm 31 and the second support joint arm 37 are rotated, the positions of the first compression plate 35 and the second compression plate 36 are changed, such that the first compression plate 35 and the second compression plate 36 are tightly attached to side walls of the corresponding second side plate 27 or first side plate 40. The first side plate 40 and the second side plate 27 are pressed tightly through the cooperation of the first compression plate 35 and the second compression plate 36 with the support platform 13, that is, the positions of the two side plates are limited in the width direction of the support platform 13.

Here, in order to apply the auxiliary clamping assembly 41 to the compression of two side plates of more specifications of shoulder joint shafts 53, a mobile rail and a micro dual axis motor located in the center of the mobile rail are disposed inside the adjusting block 34. A first slider 24a and a second slider 24a are rotatably connected to two driving shafts of the micro dual axis motor respectively, the two sliders 24a can move on the mobile rail, the first slider 24a is connected to the first compression plate 35, and the second slider 24a is connected to the second compression plate 36. After the micro dual axis motor is activated, the first compression plate 35 and the second compression plate 36 can be driven to approach or move away from each other to compress the two side plates of the rotating shaft of shoulder joint 53 at different distances.

An auxiliary compression block 25 is further disposed between the first side plate 40 and the second side plate 27.

Two end surfaces of the auxiliary compression block 25 are tightly attached to the first side plate 40 and the second side plate 27 to cooperate with the auxiliary clamping assembly 41 to clamp the first side plate 40 and the second side plate 27.

Here, a specific structure of the auxiliary compression block 25 includes, for example, a plurality of sub compression blocks and springs, where two adjacent sub compression blocks are connected by a spring. When the auxiliary compression block 25 is placed between the first side plate 40 and the second side plate 27, the positions of the two side plates can be limited in the width direction of the support platform 13.

Further, in order to avoid deformation of the first moving member 43, the second moving member 44, the first V-shaped block 5, and the second V-shaped block 6 after the first compression screw 19, the second compression screw 20, and the third compression screw 26 lock ends of the corresponding first moving member 43 and second moving member 44, a movable chamber 49 is formed inside each of the first V-shaped block 5 and the second V-shaped block 6, and an auxiliary compression assembly 50 is disposed inside the movable chamber 49.

Figure 7:
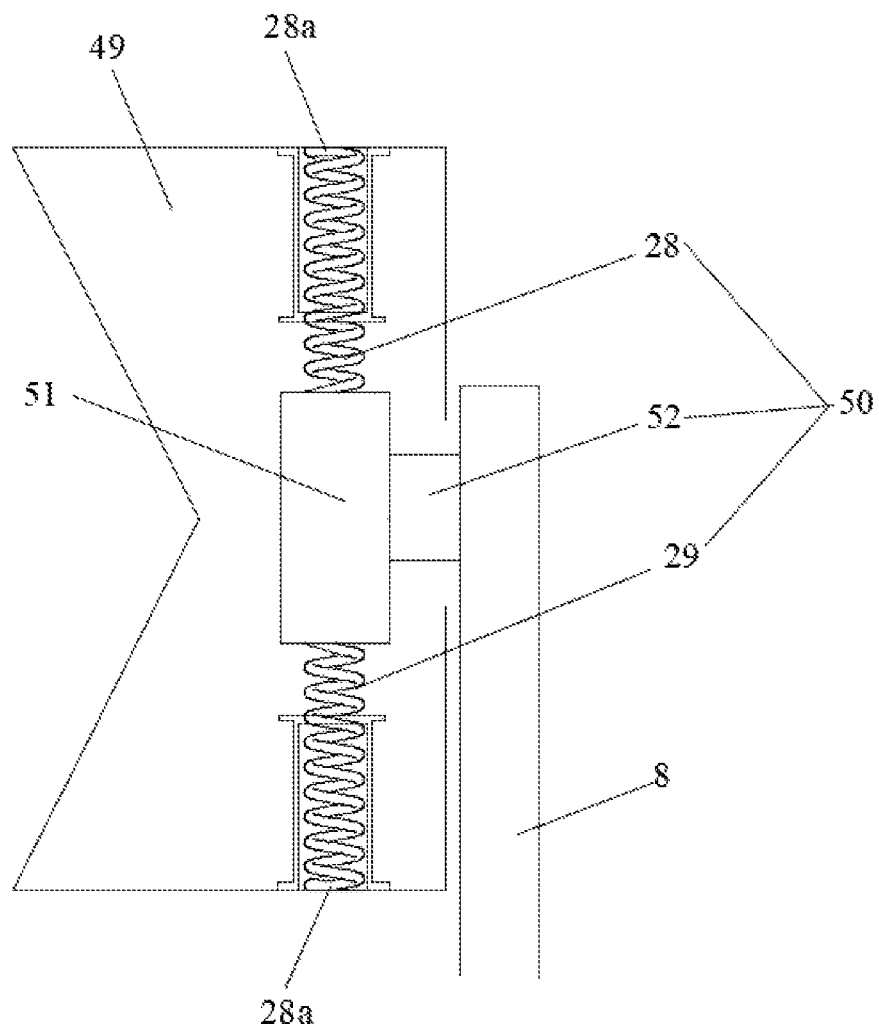
FIG. 7 is a schematic structural diagram of an auxiliary compression assembly.

As shown in FIG. 7, taking the second V-shaped block 6 as an example, the auxiliary compression assembly 50 includes:

a first elastic element 28 and a second elastic element 29 connected by a connecting block 51. A free end 28a of the first elastic element 28 is connected to an inner wall of the movable chamber 49, and a free end 28a of the second elastic element 29 is connected to the inner wall of the movable chamber 49. Here, the types of the first elastic element 28 and the second elastic element 29 are, for example, springs.

A connecting rod 52, with one end running through the movable chamber 49 and being connected to the connecting block 51, and the other end connected to the first moving member 43 or the second moving member 44.

By cooperating with the first elastic element 28 and the second elastic element 29, the first moving member 43 and the second moving member 44 can move slightly relative to the first V-shaped block 5 and the second V-shaped block 6, to assist in the locking operation of the first moving member 43 and the second moving member 44 without deformation. Meanwhile, when the first compression screw 19, the second compression screw 20, and the third compression screw 26 are not mounted, the first elastic element 28 and the second elastic element 29 cooperate to restore the first moving member 43 and the second moving member 44 to their natural state, such that the first moving member 43 and the second moving member 44 can move smoothly on the surface of the support base plate 18.

The specific working principle of the measuring tool is as follows:

First, the rotating shaft of shoulder joint 53 to be measured is placed on the support platform 13, the base 38 of the rotating shaft of shoulder joint 53 is clamped by the clamping assembly 41, then the auxiliary clamping assembly 41 cooperates with the support platform 13 to compress the first side plate 40 and the second side plate 27, and the position of the entire rotating shaft of shoulder joint 53 is limited, so as to ensure the accuracy of subsequent measurements; then, the moving unit 46 drives the first measuring end 3a, the second measuring end 16a, and the third measuring end 23a to move, the first measuring end 3a measures the distance between the first measuring end 3a and the first side plate or the second side plate in real time, the second measuring end 16a measures the distance between the second measuring end 16a and the first side plate or the second side plate in real time, the third measuring end 23a measures the distance between the third measuring end 23a and the second side plate or the first side plate in real time, the measured distance data are input into a controller for computation and processing, and a parallelism of the two side plates and a coaxiality of openings on the two side plates are ultimately obtained, thereby achieving more efficient and accurate measurement of coaxiality and parallelism; and finally, the parallelism and coaxiality obtained by the computation and processing are compared with a corresponding parallelism tolerance range and coaxiality tolerance range to determine whether the current rotating shaft of shoulder joint 53 is a qualified part, thereby improving the machining precision of the rotating shaft of shoulder joint 53.

The type of the controller is, for example, an MY-26A programmable logic controller (PLC).

Embodiment 2

A method for measuring a parallelism and coaxiality of a rotating shaft of shoulder joint 53 of a crash dummy is implemented based on the tool for measuring the parallelism and coaxiality of a rotating shaft of shoulder joint 53 of a crash dummy in Embodiment 1.

Before the coaxiality and parallelism are measured according to the following method, the rotating shaft of shoulder joint 53 to be measured is placed on the support platform 13, and the positions of the base 38, the first side plate 40, and the second side plate 27 of the rotating shaft of shoulder joint 53 are jointly limited by the clamping assembly 41, the auxiliary clamping assembly 41, the auxiliary compression block 25, and the auxiliary compression assembly 50; an initial measurement position of the first measuring end 3a is set as follows: the first lifting guide rail 2 is located at an end, near the adjusting bolt 11, of the first sliding platform 4, the first mounting plate 21 is located at an end, near the first sliding platform 4, of the first lifting guide rail 2, and the measurement position of the first measuring end 3a is at a lowest point of the first side plate 40; and initial measurement positions of the second measuring end 16a and the third measuring end 23a are as follows: the second lifting guide rail 15 is located at an end, near the first sliding platform 4, of the second sliding platform 17, the second mounting plate 22 is located an end, near the second sliding platform 17, of the second lifting guide rail 15, the second measuring end 16a and the third measuring end 23a are located at an end, near the second lifting guide rail 15, of the slide rail 24, and the measurement positions of the second measuring end 16a and the third measuring end 23a are at the lowest point of the first side plate 40 or the second side plate 27.

Figure 8:
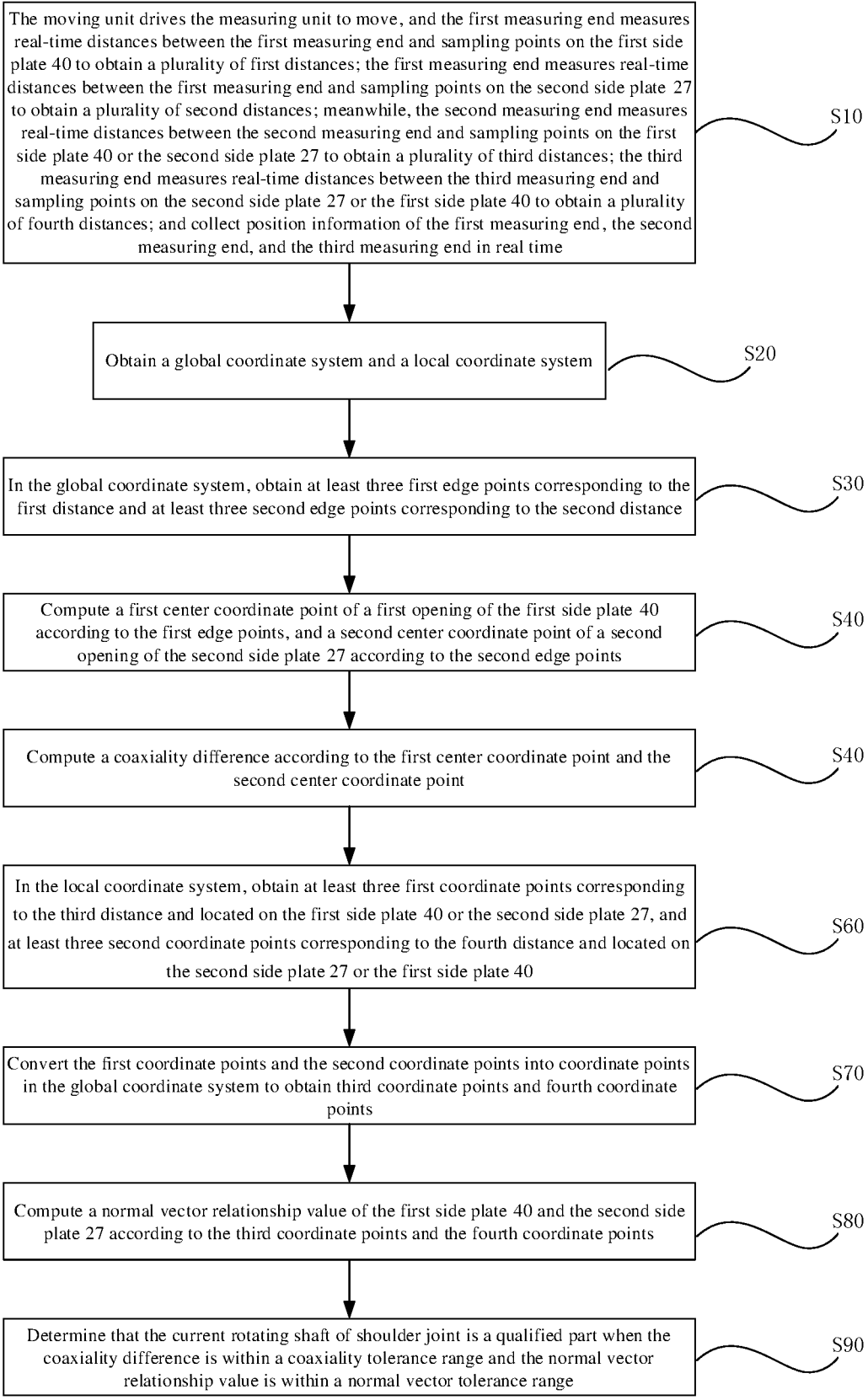
FIG. 8 is a schematic flowchart of a method for measuring a parallelism and coaxiality of a rotating shaft of shoulder joint of a crash dummy.

As shown in FIG. 8, the measuring method includes the following steps:

S10. The moving unit 46 drives the measuring unit 48 to move, and the first measuring end 3a measures real-time distances between the first measuring end 3a and sampling points on the first side plate 40 to obtain a plurality of first distances; the first measuring end 3a measures real-time distances between the first measuring end 3a and sampling points on the second side plate 27 to obtain a plurality of second distances; and simultaneously, the second measuring end 16a measures real-time distances between the second measuring end 16a and sampling points on the first side plate 40 or the second side plate 27 to obtain a plurality of third distances; the third measuring end 23a measures real-time distances between the third measuring end 23a and sampling points on the second side plate 27 or the first side plate 40 to obtain a plurality of fourth distances; and position information of the first measuring end 3a, the second measuring end 16a, and the third measuring end 23a are collected in real time;

Specifically, the first distances are real-time distances measured between the first measuring end 3a and the first side plate 40 when the first measuring end 3a moves along the first sliding platform 4 and the first lifting guide rail 2 under the action of the first lifting guide rail 2 and the first driving member 1;

The second distances are real-time distances measured between the first measuring end 3a and the second side plate 27 when the first measuring end 3a moves along the first sliding platform 4 and the first lifting guide rail 2 and passes through a first opening 40a of the first side plate 40 under the action of the first lifting guide rail 2 and the first driving member 1;

The third distances are real-time distances measured between the second measuring end 16a and the first side plate 40 or the second side plate 27 when the second measuring end 16a moves along the second sliding platform 17, the second lifting guide rail 15, and the slide rail 24 under the action of the second lifting guide rail 15, the second driving member 14, and the third driving member 47; and The fourth distances are real-time distances measured between the third measuring end 23a and the second side plate 27 or the first side plate 40 when the third measuring end 23a moves along the second sliding platform 17, the second lifting guide rail 15, and the slide rail 24 under the action of the second lifting guide rail 15, the second driving member 14, and the third driving member 47.

The real-time position information of the first measuring end 3a, the second measuring end 16a, and the third measuring end 23a can be collected by a controller in real time. Specifically, the controller is in communication connection with the driving cylinder on the first sliding platform 4, the driving cylinder on the second sliding platform 17, the first driving member 1, the second driving member 14, and the third driving member 47. The controller controls the distance of each movement of the above driving devices, and the corresponding position information of the first measuring end 3a, the second measuring end 16a, and the third measuring end 23a can be obtained.

The corresponding position information of the first measuring end 3a during each measurement includes a distance at which the corresponding driving cylinder drives the first lifting guide rail 2 to move along the first sliding platform 4, and a distance at which the first driving member 1 drives the first mounting plate 21 to move.

Both the second measuring end 16a and the third measuring end 23a are mounted on the slider 24a, so the two have the same position information, including a distance at which the corresponding driving cylinder drives the second lifting guide rail 15 to move along the second sliding platform 17, a distance at which the second driving member 14 drives the second mounting plate 22 to move, and a distance at which the third driving member 47 drives the slider 24a to move.

In addition, the first measuring end 3a, the second measuring end 16a, and the third measuring end 23a all measure a distance per set duration. Here, the set duration and the distance of each movement can be set according to actual needs. After a period of time, the measured distance data and position information can be transmitted to the controller, the controller performs subsequent processing and computation according to the distance data and position information, and data that can determine the coaxiality and parallelism are ultimately obtained.

Here, the type of the controller is, for example, an MY-26A PLC.

S20. Obtain a global coordinate system and a local coordinate system.

Figure 9:
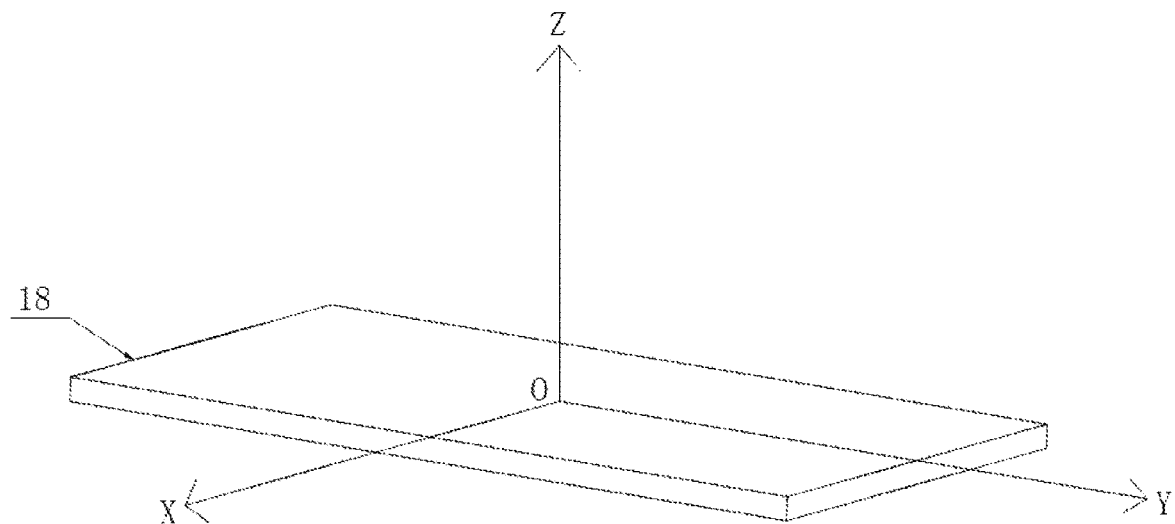
FIG. 9 is a schematic diagram of a global coordinate system.

Specifically, obtaining a global coordinate system and a local coordinate system specifically includes the following steps:

As shown in FIG. 9, the global coordinate system is built with a center position of the support base plate 18 as an origin, namely, an O point (0, 0, 0) in the figure, an extension line passing through the center position of the support base plate 18 and parallel to the width direction of the support base plate 18 as an X axis, an extension line passing through the center position of the support base plate 18 and parallel to the length direction of the support base plate 18 as a Y axis, and an extension line passing through the center position of the support base plate 18 and perpendicular to the surface of the support base plate 18 as a Z axis.

Figure 10:
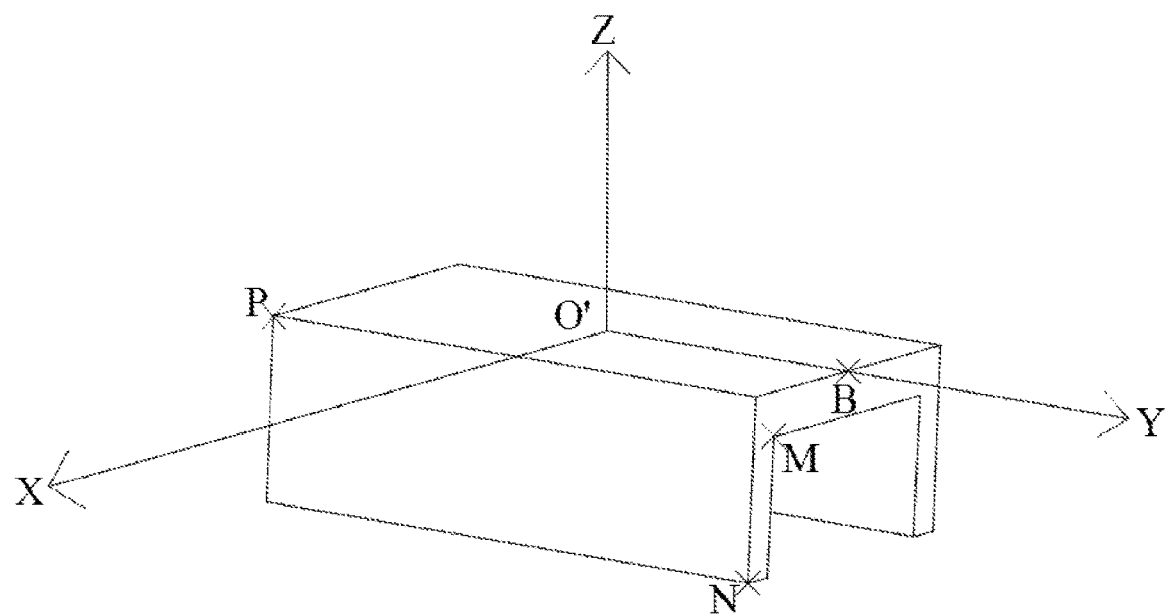
FIG. 10 is a schematic diagram of a local coordinate system.

As shown in FIG. 10, the local coordinate system is built with a center position of an upper surface of the support platform 13 as an origin, namely, an O' point (0, 0, 0) in the figure, an extension line passing through the center position of the upper surface of the support platform 13 and parallel to the width direction of the support platform 13 as an X axis, an extension line passing through the center position of the upper surface of the support platform 13 and parallel to the length direction of the support platform 13 as a Y axis, and an extension line passing through the center position of the upper surface of the support platform 13 and perpendicular to the upper surface of the support base plate 18 as a Z axis.

S30. In the global coordinate system, obtain at least three first edge points corresponding to the first distance and at least three second edge points corresponding to the second distance.

Specifically, the first edge points refer to points located on an edge of the first opening 40a of the first side plate 40; and the second edge points refer to points located on an edge of a second opening 27a of the second side plate 27.

Correspondingly, in the global coordinate system, the coordinates of each device are known, the coordinates of the first edge points can be obtained according to the first distance corresponding to the first edge points and the position information, and the coordinates of the second edge points can be obtained according to the second distance corresponding to the second edge points and the position information.

S40. Compute a first center coordinate point of the first opening 40a of the first side plate 40 according to the first edge points, and a second center coordinate point of the second opening 27a of the second side plate 27 according to the second edge points.

For example, the first opening 40a is regarded as a large circle and the second opening 27a is regarded as a small circle. The three first edge points are coordinate points on the large circle, the three second edge points are coordinate points on the small circle, and the corresponding center coordinate point is computed according to the three coordinate points on the circle, where the first center coordinate point is ($x_i$, $y_i$, $z_i$), and the second center coordinate point is ($x_i'$, $y_i'$, $z_i'$).

S50. Compute a coaxiality difference according to the first center coordinate point and the second center coordinate point.

The coaxiality difference is computed according to the following formula:

$$l_i = \sqrt{(x_i - x_i')^2 + (y_i - y_i')^2}.$$

Where $l_i$ is the coaxiality difference; and i is the number of selections of the first edge points and the second edge points.

The above process involves selecting the first edge points and the second edge points once and computating the coaxiality difference. Alternatively, different first edge points and second edge points may be selected multiple times, a plurality of coaxiality differences are computed, and a maximum value of all the coaxiality differences is selected and compared with a coaxiality tolerance range.

S60. In the local coordinate system, obtain at least three first coordinate points corresponding to the third distance and located on the first side plate 40 or the second side plate 27, and at least three second coordinate points corresponding to the fourth distance and located on the second side plate 27 or the first side plate 40.

S70. Convert the first coordinate points and the second coordinate points into coordinate points in the global coordinate system to obtain third coordinate points and fourth coordinate points.

S80. Compute a normal vector relationship value of the first side plate 40 and the second side plate 27 according to the third coordinate points and the fourth coordinate points.

Further, after obtaining third coordinate points and fourth coordinate points and before computing a normal vector relationship value of the first side plate 40 and the second side plate 27, the method further includes the following steps:

measurement coordinate vectors and measurement errors of verification points in the global coordinate system and the local coordinate system are obtained, where the verification points include coordinates of any four points of the support platform 13 in the global coordinate system and the local coordinate system, and the any four points are the first coordinate points, the second coordinate points, the third coordinate points, and the fourth coordinate points.

For example, as shown in FIG. 10, the points selected on the support platform 13 are B, P, M, and N. The coordinates of the four points are known in both the global coordinate system and the local coordinate system.

Taking point P as an example, the coordinates of point P are set as (x, y, z) in the global coordinate system and (x', y', z') in the local coordinate system; $\vec{OP} = x \cdot \vec{i} + y \cdot \vec{j} + z \cdot \vec{k}$; and $\vec{OO'} = m \cdot \vec{i} + n \cdot \vec{j} + s \cdot \vec{k}$.

Where $\vec{i}$, $\vec{j}$, and $\vec{k}$ are unit vectors in the X, Y, and Z directions of the global coordinate system, respectively; $\vec{i}'$, $\vec{j}'$, and $\vec{k}'$ are unit vectors in the X, Y, and Z directions of the local coordinate system, respectively; and the coordinates of O' in the global coordinate system are (m, n, s).

Correspondingly, corresponding relationships between the coordinate axes of the global coordinate system and the local coordinate system are as follows:

$$\vec{i}' = u_{11} \cdot \vec{i} + u_{12} \cdot \vec{j} + u_{13} \cdot \vec{k};$$

$$\vec{j}' = u_{21} \cdot \vec{i} + u_{22} \cdot \vec{j} + u_{23} \cdot \vec{k};$$

$$\vec{k}' = u_{31} \cdot \vec{i} + u_{32} \cdot \vec{j} + u_{33} \cdot \vec{k};$$

A computational formula for an O'P vector of point P in the local coordinate system is as follows:

$$\vec{O'P} = x' \cdot \vec{i}' + y' \cdot \vec{j}' + z' \cdot \vec{k}';$$

According to the above corresponding relationships between the coordinate axes, a computational formula for collating the O'P vector is as follows:

$$\vec{O'P} = x' \cdot (u_{11} \cdot \vec{i} + u_{12} \cdot \vec{j} + u_{13} \cdot \vec{k}) + y' \cdot (u_{21} \cdot \vec{i} + u_{22} \cdot \vec{j} + u_{23} \cdot \vec{k}) + z' \cdot (u_{31} \cdot \vec{i} + u_{32} \cdot \vec{j} + u_{33} \cdot \vec{k}) = (x' \cdot u_{11} + y' \cdot u_{21} + z' \cdot u_{31}) \cdot (x' \cdot u_{12} + y' \cdot u_{22} + z' \cdot u_{32}) \cdot \vec{j} + (x' \cdot u_{13} + y' \cdot u_{23} + z' \cdot u_{33}) \cdot \vec{k};$$

Due to $\vec{OP} = \vec{OO'} + \vec{O'P}$, correspondingly, $$\begin{cases} x = m + u_{11} \cdot x' + u_{21} \cdot y' + u_{31} \cdot z' \\ y = n + u_{12} \cdot x' + u_{22} \cdot y' + u_{32} \cdot z' \\ z = s + u_{13} \cdot x' + u_{23} \cdot y' + u_{33} \cdot z' \end{cases};$$

A conversion relationship is obtained: (x y z 1)=(x' y' z' 1)·W;

a matrix relationship is built by points B, P, M, and N, and the following is set: in the global coordinate system, the coordinates of point B are (x1, y1, z1), the coordinates of point P are (x2, y2, z2), the coordinates of point M are (x3, y3, z3), and the coordinates of point N are (x4, y4, z4); and in the local coordinate system, the coordinates of point B are (x'1, y'1, z'1), the coordinates of point P are (x'2, y'2, z'2), the coordinates of point M are (x'3, y'3, z'3), and the coordinates of point N are (x'4, y'4, z'4). Here, the coordinates (x2, y2, z2) of point P are equal to the coordinates (x, y, z) of point P in the global coordinate system, and the coordinates (x'2, y'2, z'2) of point P are equal to the coordinates (x', y', z') of point P in the local coordinate system;

The matrix relationship is expressed according to the following formula: A=QW;

$$\begin{pmatrix} x_1 & y_1 & z_1 & 1 \\ x_2 & y_2 & z_2 & 1 \\ x_3 & y_3 & z_3 & 1 \\ x_4 & y_4 & z_4 & 1 \end{pmatrix} = \begin{pmatrix} x_1' & y_1' & z_1' & 1 \\ x_2' & y_2' & z_2' & 1 \\ x_3' & y_3' & z_3' & 1 \\ x_4' & y_4' & z_4' & 1 \end{pmatrix} \begin{pmatrix} u_{11} & u_{12} & u_{13} & 0 \\ u_{21} & u_{22} & u_{23} & 0 \\ u_{31} & u_{32} & u_{33} & 0 \\ m & n & s & 1 \end{pmatrix};$$

Where A is a coordinate matrix of points B, P, M, and N in the global coordinate system, Q is a coordinate matrix of points B, P, M, and N in the local coordinate system, and W is an inverse matrix of matrix Q.

The inverse matrix of matrix Q is computed to obtain W=AQ−1;

The matrix W is obtained by computation:

$$W = \begin{pmatrix} u_{11} & u_{12} & u_{13} & 0 \\ u_{21} & u_{22} & u_{23} & 0 \\ u_{31} & u_{32} & u_{33} & 0 \\ m & n & s & 1 \end{pmatrix};$$

According to matrix W, the coordinates of each point in the global coordinate system are obtained.

The following is set: the vectors in the local coordinate system and the global coordinate system are $\vec{x}$ and $\vec{y}$, respectively; then the following formula is obtained:

$$\vec{y} = \vec{t} + gR\vec{x}$$

Where $\vec{t}$ represents translation; g represents a conversion scale; R represents rotation, and is a 3×3 orthogonal matrix.

An estimated value, a scale value, and a translation quantity are computed according to the verification points;

An estimation error value is computed according to the measurement coordinate vectors, the estimated value, the scale value, and the translation quantity;

Specifically, the measurement coordinate vectors of the $I^{th}$ verification point in the local coordinate system and the global coordinate system are set as $\tilde{x}_I$, and $\tilde{y}_I$, and relevant measurement errors are $\hat{e}_I$ and $\hat{v}_I$, respectively; a computational model for the $I^{th}$ verification point is: $\tilde{y}_I - \hat{v}_I = \vec{t} + gR(\tilde{x}_I - \hat{e}_I)$;

Barycentric coordinates of the local coordinate system and the global coordinate system are computed using the selected verification points:

$$\bar{x} = \frac{1}{q}\sum_{I=1}^{q} \tilde{x}_I, \bar{y} = \frac{1}{q}\sum_{I=1}^{q} \tilde{y}_I;$$

Where q is the number of verification points.

Then the coordinates of each verification point relative to the barycentric coordinates are computed:

$$\Delta x_I = \tilde{x}_I - \bar{x}, \Delta y_I = \tilde{y}_I - \bar{y};$$

A rotation contour matrix is computed according to the coordinates of each verification point relative to the barycentric coordinates:

$$H = \sum_{I=1}^{q} \Delta y_I \Delta x_I^T;$$

Where T represents transposition of the matrix.

A singular value decomposition of the rotation contour matrix is computed to obtain matrices U, D, and V: $H=UDV^T$;

An estimated value is computed: $\hat{R}=UWV^T$:

Where $$W = \begin{pmatrix} 1 & 0 & 0 \\ 0 & 1 & 0 \\ 0 & 0 & \det[U]\det[V] \end{pmatrix};$$

Rotational inertias of the local coordinate system and the global coordinate system are computed separately:

$$a = \sum_{I=1}^{q} \Delta x_I^T \Delta x_I, b = \sum_{I=1}^{q} \Delta y_I^T \Delta y_I;$$

A cross rotational inertia is computed: $c=tr[\hat{R}H^T]$, where tr is a matrix trace operator;

According to the above rotational inertias and cross rotational inertia, a scale is estimated:

$$\hat{g} = \frac{-d+f}{2c\sigma_x^2};$$

Where the above scale estimation formula is a simplified formula, where d represents $\sigma_y^2-\sigma_x^2 b$, namely, $d=\sigma_y^2 a - \sigma_x^2 b$; f represents $\sqrt{d^2+4\sigma_y^2\sigma_x^2 c^2}$, namely, $f=\sqrt{d^2+4\sigma_y^2\sigma_x^2 c^2}$;

The translation quantity is estimated:
$\hat{t}=\bar{y}-\hat{g}\hat{R}\bar{x}$;

An estimated error value and estimated coordinates are computed:

$$\hat{e}_I = -\frac{g\sigma_x^2}{\sigma_y^2 + g^2\sigma_x^2}\hat{R}^T(y_I - \hat{t} - \hat{g}\hat{R}x_I);$$

$$\hat{v}_I = -\frac{g\sigma_x^2}{\sigma_y^2 + g^2\sigma_x^2}\hat{R}^T(y_I - \hat{t} - \hat{g}\hat{R}x_I);$$

$$\hat{x}_I = \tilde{x}_I - \hat{e}_I;$$

$$\hat{y}_I = \tilde{y}_I - \hat{v}_I;$$

Where $\sigma_x^2$ is a variance of $\hat{e}_I$, $\sigma_y^2$ is a variance of $\hat{v}_I$, and the two variances can be computed through the points with known coordinates in the local coordinate system and the global coordinate system.

When the estimated error value is less than a preset difference, it is determined that the distortion of conversion of the first coordinate points and the second coordinate points into the third coordinate points and the fourth coordinate points meets preset requirements. Here, the preset difference may be set according to actual needs.

The magnitude of distortion after coordinate conversion is determined according to the estimated error value. If the estimated error value exceeds the preset difference, it indicates that the distortion exceeds expectation, and the first coordinate points and the second coordinate points need to be reselected until the distortion is within a reasonable range.

After the above distortion verification process, two matrices are built through the selected first coordinate points on the first side plate 40 and the selected second coordinate points on the second side plate 27, respectively:

$$\begin{pmatrix} a_{11} & a_{12} & a_{13} \\ a_{21} & a_{22} & a_{23} \\ a_{31} & a_{32} & a_{33} \end{pmatrix}, \begin{pmatrix} a'_{11} & a'_{12} & a'_{13} \\ a'_{21} & a'_{22} & a'_{23} \\ a'_{31} & a'_{32} & a'_{33} \end{pmatrix};$$

A mean and a variance are computed to obtain a standard matrix E, and then a covariance matrix F is computed according to the standard matrix E; feature decomposition is performed on the covariance matrix F to obtain eigenvalues of the covariance matrix, namely, $\lambda_1$, $\lambda_2$, and $\lambda_3$, and corresponding eigenvectors are $\vec{a}_1$, $\vec{a}_2$, and $\vec{a}_3$; and the eigenvectors are compared, the eigenvector corresponding to a minimum eigenvalue is selected as a normal vector of a fitting plane, and two plane normal vectors $\vec{b}_1$ and $\vec{b}_2$ are solved.

A normal vector relationship value of the first side plate 40 and the second side plate 27 is computed according to the following formula:

$$\cos\theta_l = \frac{\vec{b}_{l1} \cdot \vec{b}_{l2}}{|\vec{b}_{l1}| \cdot |\vec{b}_{l2}|};$$

Where $\cos \theta_1$ is the normal vector relationship value of the first side plate 40 and the second side plate 27, $\vec{b}_{l1}$ on is a normal vector of a surface, near the second side plate 27, of the first side plate 40, and $\vec{b}_{l2}$ is a normal vector of a surface, near the first side plate 40, of the second side plate 27.

Alternatively, a plurality of normal vector relationship values may be computed by obtaining different first coordinate points and second coordinate points multiple times, and the plurality of normal vector relationship values are compared with a normal vector tolerance range. When the normal vectors of two planes are parallel to each other, the two planes are also parallel to each other. That is, when the normal vector relationship values are within the normal vector tolerance range, it indicates that the normal vectors of the first side plate 40 and the second side plate 27 are parallel to each other, the first side plate 40 and the second side plate 27 are also parallel to each other, and the parallelism of the two side walls also meets requirements.

S90. Determine that the current rotating shaft of shoulder joint 53 is a qualified part when the coaxiality difference is within a coaxiality tolerance range and the normal vector relationship value is within a normal vector tolerance range.

Here, the coaxiality tolerance range is, for example, 0.05-0.1, and the normal vector tolerance range is, for example, less than 0.1.

The foregoing measuring method in the present application can efficiently and accurately measure the coaxiality of two openings and the parallelism of two side walls, and improve the machining precision of the rotating shaft of shoulder joint 53.

Described above are only preferred embodiments of the present application and descriptions of the applied technical principles. Those skilled in the art should understand that, the application scope referred to in the present application is not limited to the technical solutions formed by specific combinations of the technical features, but should also cover other technical solutions formed by any combination of the technical features or equivalent features without departing from the application concept. For example, technical solutions formed by replacing the features with (but not limited to) technical features with similar functions in the present application are included.

What is claimed is:

1. A tool for measuring a parallelism and coaxiality of a rotating shaft of shoulder joint of a crash dummy, comprising:

a support base plate, wherein a support platform for bearing the rotating shaft of shoulder joint is disposed on the support base plate; a width direction of the support platform is parallel to that of the support base plate, and a length direction of the support platform is parallel to that of the support base plate; the rotating shaft of shoulder joint comprises a base, a mounting platform is disposed on the base, and a first side plate and a second side plate are disposed on a side, away from the base, of the mounting platform;

a clamping assembly, wherein the clamping assembly comprises a first support seat disposed on the support base plate, and a first V-shaped block and a second V-shaped block connected to the first support seat through an adjusting member; an accommodating space is formed between the first V-shaped block and the second V-shaped block to accommodate the base; when the adjusting member rotates relative to the first support seat, the first V-shaped block and the second V-shaped block are driven to approach each other, so as to clamp the base; and a measuring assembly, wherein the measuring assembly comprises a moving unit disposed on the support base plate and a measuring unit disposed on the moving unit; the measuring unit has a first measuring end, a second measuring end, and a third measuring end; a measuring direction of the first measuring end faces a surface, away from the second side plate, of the first side plate, and the first measuring end is used for measuring the distance between the first measuring end and the first side plate or the second side plate; the second measuring end and the third measuring end are located between the first side plate and the second side plate, a measuring direction of the second measuring end is opposite to that of the third measuring end, and the measuring direction of the second measuring end is parallel to the width direction of the support platform; the second measuring end is used for measuring the distance between the second measuring end and the first side plate or the second side plate; the third measuring end is used for measuring the distance between the third measuring end and the second side plate or the first side plate;

wherein the moving unit has a driving end, which is connected to the measuring unit and is used for driving the measuring unit to move, so as to change relative positions of the first measuring end, the second measuring end, the third measuring end, and the corresponding first side plate or second side plate.

2. The tool for measuring the parallelism and coaxiality of the rotating shaft of shoulder joint of the crash dummy according to claim 1, further comprising an auxiliary clamping assembly, wherein the auxiliary clamping assembly comprises:

a support arm disposed on the support base plate;

a first support joint arm rotatably connected to the support arm through a first pin shaft;

a second support joint arm rotatably connected to the first support joint arm through a second pin shaft; and a first compression plate and a second compression plate hinged with the second support joint arm through an adjusting block;

wherein when the first support joint arm and the second support joint arm are rotated, positions of the first compression plate and the second compression plate are changed, such that the first compression plate and the second compression plate are tightly attached to side walls of the corresponding first side plate or second side plate.

3. The tool for measuring the parallelism and coaxiality of the rotating shaft of shoulder joint of the crash dummy according to claim 2, wherein an auxiliary compression block is further disposed between the first side plate and the second side plate; and two end surfaces of the auxiliary compression block are tightly attached to the first side plate and the second side plate to cooperate with the auxiliary clamping assembly to clamp the first side plate and the second side plate.

4. The tool for measuring the parallelism and coaxiality of the rotating shaft of shoulder joint of the crash dummy according to claim 1, wherein the adjusting member comprises:

an adjusting bolt rotatably connected to the first support seat, wherein the adjusting bolt has a first threaded segment and a second threaded segment with opposite rotation directions;

a first moving member having a first threaded hole, wherein the first threaded hole is sleeved on the first threaded segment, and the first V-shaped block is disposed on the first moving member; and a second moving member having a second threaded hole, wherein the second threaded hole is sleeved on the second threaded segment, and the second V-shaped block is disposed on the second moving member;

wherein when the adjusting bolt rotates, the first moving member and the second moving member move along the adjusting bolt, so as to drive the corresponding first V-shaped block and second V-shaped block to approach or move away from each other.

5. The tool for measuring the parallelism and coaxiality of the rotating shaft of shoulder joint of the crash dummy according to claim 4, wherein a movable chamber is formed inside each of the first V-shaped block and the second V-shaped block, and an auxiliary compression assembly is disposed inside the movable chamber; and the auxiliary compression assembly comprises:

a first elastic element and a second elastic element connected by a connecting block, wherein a free end of the first elastic element is connected to an inner wall of the movable chamber, and a free end of the second elastic element is connected to the inner wall of the movable chamber; and a connecting rod, with one end running through the movable chamber and being connected to the connecting block, and the other end connected to the first moving member or the second moving member.

6. The tool for measuring the parallelism and coaxiality of the rotating shaft of shoulder joint of the crash dummy according to claim 1, wherein the moving unit comprises:

a first sliding platform disposed on the support base plate, wherein a first lifting guide rail is connected to the first sliding platform in a sliding manner, and a sliding direction of the first lifting guide rail is parallel to the length direction of the support base plate; a movable first mounting plate is disposed on the first lifting guide rail, and a moving direction of the first mounting plate is perpendicular to a surface of the support base plate;

a first driving member disposed at either end of the first lifting guide rail, wherein a driving end of the first driving member is connected to the first mounting plate;

a second sliding platform disposed on the support base plate, wherein a second lifting guide rail is connected to the second sliding platform in a sliding manner, and a sliding direction of the second lifting guide rail is perpendicular to that of the first lifting guide rail; a movable second mounting plate is disposed on the second lifting guide rail, and a moving direction of the second mounting plate is parallel to that of the first mounting plate;

a second driving member disposed at either end of the second lifting guide rail, wherein a driving end of the second driving member is connected to the second mounting plate;

a slide rail mounted on the second mounting plate and located between the first side plate and the second side plate, wherein a movable slider is disposed on the slide rail; a moving direction of the slider is parallel to the length direction of the support platform; and a third driving member disposed at either end of the slide rail, wherein the third driving member is connected to the slider.

7. The tool for measuring the parallelism and coaxiality of the rotating shaft of shoulder joint of the crash dummy according to claim 6, wherein the measuring unit comprises:

a first distance measuring member disposed on the first mounting plate, wherein a measuring end of the first distance measuring member is the first measuring end; and a second distance measuring member and a third distance measuring member disposed on the slider, wherein a measuring end of the second distance measuring member is the second measuring end, and a measuring end of the third distance measuring member is the third measuring end.

8. A method for measuring a parallelism and coaxiality of a rotating shaft of shoulder joint of a crash dummy, implemented based on the tool for measuring the parallelism and coaxiality of the rotating shaft of shoulder joint of the crash dummy according to claim 1, comprising:

driving, by the moving unit, the measuring unit to move, and measuring, by the first measuring end, real-time distances between the first measuring end and sampling points on the first side plate to obtain a plurality of first distances;

measuring, by the first measuring end, real-time distances between the first measuring end and sampling points on the second side plate to obtain a plurality of second distances; and simultaneously, measuring, by the second measuring end, real-time distances between the second measuring end and sampling points on the first side plate or the second side plate to obtain a plurality of third distances;

measuring, by the third measuring end, real-time distances between the third measuring end and sampling points on the second side plate or the first side plate to obtain a plurality of fourth distances; collecting position information of the first measuring end, the second measuring end, and the third measuring end in real time;

obtaining a global coordinate system and a local coordinate system;

in the global coordinate system, obtaining at least three first edge points corresponding to the first distance and at least three second edge points corresponding to the second distance;

computing a first center coordinate point of a first opening of the first side plate according to the first edge points, and a second center coordinate point of a second opening of the second side plate according to the second edge points;

computing a coaxiality difference according to the first center coordinate point and the second center coordinate point;

in the local coordinate system, obtaining at least three first coordinate points corresponding to the third distance and located on the first side plate or the second side plate, and at least three second coordinate points corresponding to the fourth distance and located on the second side plate or the first side plate;

converting the first coordinate points and the second coordinate points into coordinate points in the global coordinate system to obtain third coordinate points and fourth coordinate points;

computing a normal vector relationship value of the first side plate and the second side plate according to the third coordinate points and the fourth coordinate points; and determining that the current rotating shaft of shoulder joint is a qualified part when the coaxiality difference is within a coaxiality tolerance range and the normal vector relationship value is within a normal vector tolerance range;

wherein obtaining a global coordinate system and a local coordinate system specifically comprises the following steps:

building the global coordinate system with a center position of the support base plate as an origin, an extension line passing through the center position of the support base plate and parallel to the width direction of the support base plate as an X axis, an extension line passing through the center position of the support base plate and parallel to the length direction of the support base plate as a Y axis, and an extension line passing through the center position of the support base plate and perpendicular to the surface of the support base plate as a Z axis; and building the local coordinate system with a center position of an upper surface of the support platform as an origin, an extension line passing through the center position of the upper surface of the support platform and parallel to the width direction of the support platform as an X axis, an extension line passing through the center position of the upper surface of the support platform and parallel to the length direction of the support platform as a Y axis, and an extension line passing through the center position of the upper surface of the support platform and perpendicular to the upper surface of the support base plate as a Z axis.

9. The method for measuring the parallelism and coaxiality of the rotating shaft of shoulder joint of the crash dummy according to claim 8, wherein after obtaining third coordinate points and fourth coordinate points and before computing a normal vector relationship value of the first side plate and the second side plate, the method further comprises the following steps:

obtaining measurement coordinate vectors and measurement errors of verification points in the global coordinate system and the local coordinate system, wherein the verification points comprise coordinates of any four points of the support platform in the global coordinate system and the local coordinate system, the any four points are the first coordinate points, the second coordinate points, the third coordinate points, and the fourth coordinate points;

computing an estimated value, a scale value, and a translation quantity according to the verification points;

computing an estimation error value according to the measurement coordinate vectors, the estimated value, the scale value, and the translation quantity; and when the estimated error value is less than a preset difference, determining that the distortion of conversion of the first coordinate points and the second coordinate points into the third coordinate points and the fourth coordinate points meets preset requirements.

* * * * *